United States Patent
Guha et al.

(10) Patent No.: US 10,320,041 B2
(45) Date of Patent: Jun. 11, 2019

(54) ZINC-AIR BATTERY SURFACTANTS

(71) Applicant: SPECTRUM BRANDS, Middleton, WI (US)

(72) Inventors: Abhishek Guha, Middleton, WI (US); Marc Syvertsen, Madison, WI (US); Tony M. Rubsam, Madison, WI (US)

(73) Assignee: Energizer Brands, LLC, St. Louis, MO (US)

( * ) Notice: Subject to any disclaimer, the term of this patent is extended or adjusted under 35 U.S.C. 154(b) by 18 days.

(21) Appl. No.: 15/518,751

(22) PCT Filed: Oct. 14, 2015

(86) PCT No.: PCT/US2015/055603
§ 371 (c)(1),
(2) Date: Apr. 12, 2017

(87) PCT Pub. No.: WO2016/061276
PCT Pub. Date: Apr. 21, 2016

(65) Prior Publication Data
US 2017/0237134 A1    Aug. 17, 2017

Related U.S. Application Data

(60) Provisional application No. 62/064,241, filed on Oct. 15, 2014, provisional application No. 62/064,269, filed on Oct. 15, 2014.

(51) Int. Cl.
*H01M 12/08* (2006.01)
*H01M 6/04* (2006.01)
*H01M 10/42* (2006.01)
*H01M 12/06* (2006.01)

(52) U.S. Cl.
CPC .......... *H01M 12/08* (2013.01); *H01M 6/045* (2013.01); *H01M 10/4235* (2013.01); *H01M 12/06* (2013.01); *H01M 2300/0014* (2013.01); *H01M 2300/0025* (2013.01); *Y02E 60/128* (2013.01)

(58) Field of Classification Search
None
See application file for complete search history.

(56) References Cited

U.S. PATENT DOCUMENTS 5,401,590 A * 3/1995 Chalilpoyil ........... H01M 4/244
                                                    429/212
5,468,353 A * 11/1995 Anich .................. C25C 1/00
                                                    205/581
(Continued)

FOREIGN PATENT DOCUMENTS

EP    2 701 221 A1    2/2014
JP    05_013072    *    1/1993 .............. H01M 4/06
(Continued)

OTHER PUBLICATIONS

JP05135776A, Ishiuchi, Machine Translation, Jun. 1993 (Year: 1993).*
(Continued)

*Primary Examiner* — Devina Pillay
(74) *Attorney, Agent, or Firm* — Foley & Lardner LLP

(57) ABSTRACT

A zinc-air battery includes an air cathode, a zinc anode, and an electrolyte, wherein the electrolyte includes an amphoteric fluorosurfactant.

14 Claims, 7 Drawing Sheets

(56) References Cited

U.S. PATENT DOCUMENTS

| | | | |
|---|---|---|---|
| 6,551,742 B1 * | 4/2003 | Huq | H01M 2/0272 29/623.1 |
| 8,435,312 B2 | 5/2013 | Chen | |
| 2004/0076878 A1 * | 4/2004 | Ndzebet | H01M 4/244 429/212 |
| 2005/0003271 A1 | 1/2005 | Jiang et al. | |
| 2007/0141007 A1 | 6/2007 | Glynn | |
| 2013/0115530 A1 | 5/2013 | McKenzie et al. | |
| 2014/0057183 A1 | 2/2014 | Pratt | |

FOREIGN PATENT DOCUMENTS

| | | | | |
|---|---|---|---|---|
| JP | 05-135776 | * | 6/1993 | H01M 6/06 |
| JP | 2009285350 A | * | 12/2009 | A62D 1/02 |

OTHER PUBLICATIONS

JP05013072, Watanabe, Machine Translation, Jan. 1993 (Year: 1993).*
Pletcher, "A novel flow battery—A lead-acid battery based on an electrolyte with soluble lead(II) V. Studies of the lead negative electrode", Journal of Power Sources 180 (2008) 621-629 (Year: 2008).*
Hamano, Hiroyuki, JP-2009285350-A Machine Translation (Year: 2009).*
International Search Report and Written Opinion in PCT/2015/055603, dated Feb. 19, 2016 (13 pages).
Extended European Search Report, EP 15849873.3, Spectrum Brands, Inc, dated Feb. 28, 2018.
Pletcher D et al, "A novel flow battery—A lead-acid battery based on an electrolyte with soluble lead(II)", Journal of Power Sources, Elsevier SA, CH, vol. 180, No. 1, 2008.

* cited by examiner

ZINC-AIR BATTERY SURFACTANTS

CROSS-REFERENCE TO RELATED APPLICATIONS

This application is a U.S. National Phase Application under 35 U.S.C. § 371 of International Application No. PCT/US2015/055603, filed on Oct. 14, 2015, which claims the benefit to U.S. Provisional Application Nos. 62/064,241, filed Oct. 15, 2014, and 62/064,269, filed Oct. 15, 2014, the entire contents of which are hereby incorporated by reference in their entirety.

FIELD

The present technology is generally related to the field of zinc-air batteries and the uses thereof.

SUMMARY

In one aspect, a zinc-air battery is provided including an air cathode, a zinc anode, and an electrolyte, wherein the electrolyte includes an amphoteric fluorosurfactant.

In one embodiment, the amphoteric fluorosurfactant is CHEMGUARD® S-111, CHEMGUARD® S-500, CAPSTONE® FS-50, CAPSTONE®FS-51, APFS-14, DYNAX DX3001, Zonyl® FSK, Zonyl® FS-500 or a combination of any two or more thereof.

In one embodiment, the amphoteric fluorosurfactant is present in the electrolyte from about 200 ppm to about 20000 ppm. In one embodiment, the amphoteric fluorosurfactant concentration in the electrolyte is about 4000 ppm. In one embodiment, the amphoteric fluorosurfactant concentration in the electrolyte is about 10000 ppm.

In one embodiment, the electrolyte further includes a surfactant selected that is hexyl diphenyl oxide disulfonic acid, diethylenetriamine, octylphenoxypolyethoxyethanol, a compound of Formula (III), or a combination of any two or more thereof.

In one embodiment, the electrolyte may include a surfactant system, a corrosion inhibitor (i.e., indium hydroxide, lithium hydroxide, polyaniline, polyethylene glycol, or polypropylene glycol), a gelling agent (i.e., polyacrylate polymer), gas suppressing additive (i.e.; zinc oxide, aluminum hydroxide, lead acetate or calcium bromide), potassium hydroxide, sodium hydroxide, cesium hydroxide, other functional additives (i.e., bismuth oxide, boric acid, sodium borate, potassium borate, sodium stannate, potassium stannate), or a combination of any two or more thereof.

In one embodiment, the zinc-air battery may include a separator between the air cathode and the zinc anode.

In one embodiment, the electrolyte may include a corrosion inhibitor. In some embodiments, the corrosion inhibitor may be present in the electrolyte from about 100 ppm to about 25000 ppm.

In one embodiment, the corrosion inhibitor is a polyaniline, polyethylene glycol, polypropylene glycol, lithium hydroxide, indium hydroxide, or combinations of any two or more thereof. In a particular embodiment, the polyaniline is an emeraldine polyaniline.

In another aspect, a zinc-air battery is provided including an air cathode, a zinc anode, and an electrolyte, wherein the electrolyte includes a surfactant of Formula (II)

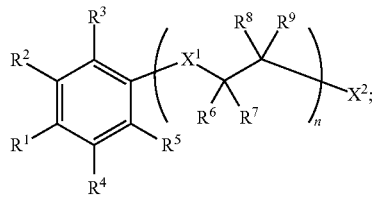

Formula (II)

wherein $R^1$, $R^2$, $R^3$, $R^4$, $R^5$, $R^6$, $R^7$, $R^8$, and $R^9$ are each independently a hydrogen, substituted or unsubstituted alkyl, alkenyl, or cycloalkyl group; $X^1$ is O or S; $X^2$ is OH or SH; and n is 5-50. In some embodiments, $R^1$ is a $C_1$-$C_{12}$ alkyl group; $R^2$, $R^3$, $R^4$, R, $R^6$, $R^7$, $R^8$, and $R^9$ are each hydrogen; $X^1$ is O; $X^2$ is OH; and n is 5-15. In some embodiments, $R^1$ is octyl and n is 5-10. In another embodiment, $R^1$ is 1,1,3,3-tetramethylbutyl or n-octyl and n is 5-10. In another embodiment, $R^1$ is 1,1,3,3-tetramethylbutyl and n is 5-10.

In one embodiment, the surfactant of Formula (II) is Igepal® CA-630 (nonionic alkylaryl phenol surfactant available from Rhodia), Triton® X-100 (nonionic octylphenol ethoxylate surfactant available from Dow Chemical Company), or a combination thereof.

In one embodiment, the surfactant of Formula (II) is present in the electrolyte from about 200 ppm to about 20,000 ppm, based upon the total weight of the electrolyte. In another embodiment, the surfactant is present in the electrolyte from about 2000 ppm to about 15000 ppm. In another embodiment, the surfactant concentration in the electrolyte is about 3000 ppm to about 12000. In one embodiment, the surfactant concentration in the electrolyte is about 4000 ppm.

In one embodiment, the electrolyte further includes a second surfactant. In some embodiments the second surfactant is hexyl diphenyl oxide sulfonic acid, diethylenetriamine, an amphoteric fluorosurfactant, or a combination of any two or more thereof.

In one embodiment, the electrolyte may include a surfactant system, a corrosion inhibitor (i.e., indium hydroxide, lithium hydroxide, polyaniline, polyethylene glycol, or polypropylene glycol), a gelling agent (i.e., polyacrylate polymer), gas suppressing additive (i.e.; zinc oxide, aluminum hydroxide, or calcium bromide), potassium hydroxide, sodium hydroxide, lead acetate, bismuth oxide, cesium hydroxide, other functional additives (i.e., boric acid, sodium borate, sodium stannate, potassium stannate), or a combination of any two or more thereof.

In one embodiment, the zinc-air battery may include a separator between the air cathode and the zinc anode.

In one embodiment, the electrolyte may include a corrosion inhibitor. In some embodiments, the corrosion inhibitor may be present in the electrolyte from about 100 ppm to about 15,000 ppm.

In one embodiment, the corrosion inhibitor is a polyaniline, polyethylene glycol, polypropylene glycol, lithium hydroxide, indium hydroxide, or combinations of any two or more thereof. In a particular embodiment, the polyaniline is an emeraldine polyaniline.

The foregoing summary is illustrative only and is not intended to be in any way limiting. In addition to the illustrative aspects, embodiments and features described above, further aspects, embodiments and features will become apparent by reference to the following drawings and the detailed description.

DETAILED DESCRIPTION

Figure 1:
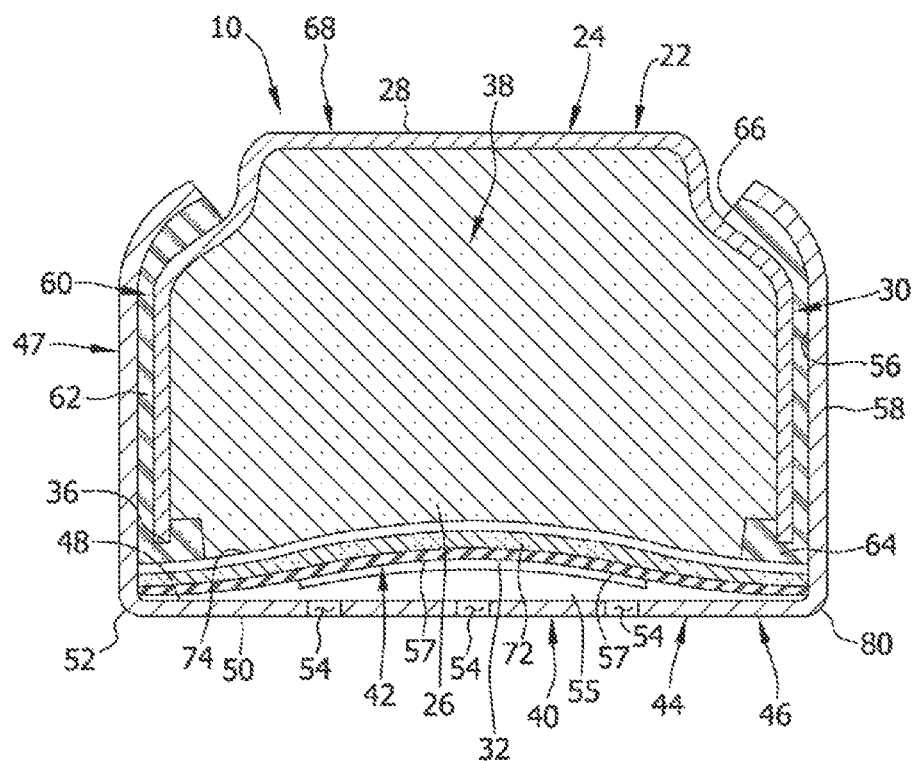
FIG. 1 is a cross-sectional, schematic view depicting an exemplary electrochemical cell of an embodiment of the present disclosure.
Figure 2:
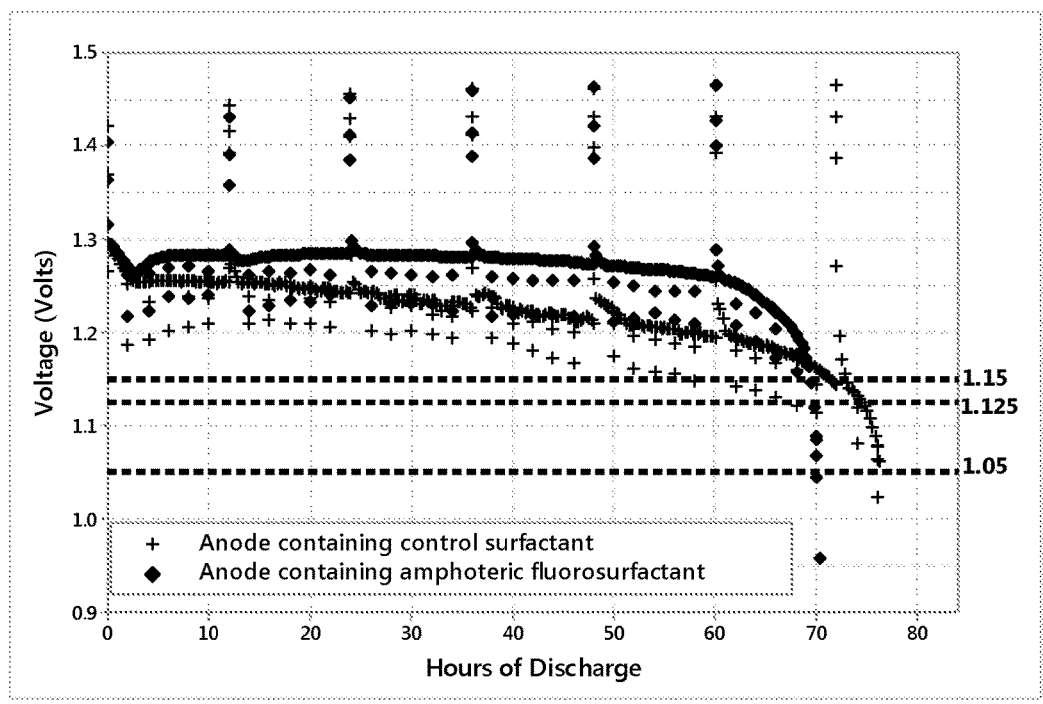
FIG. 2 is a hearing aid standard pulse discharge curve comparison between a control anode (containing a control surfactant) and an anode containing 4000 ppm of an amphoteric fluorosurfactant at 4-month room temperature delay, according to the examples.
Figure 3:
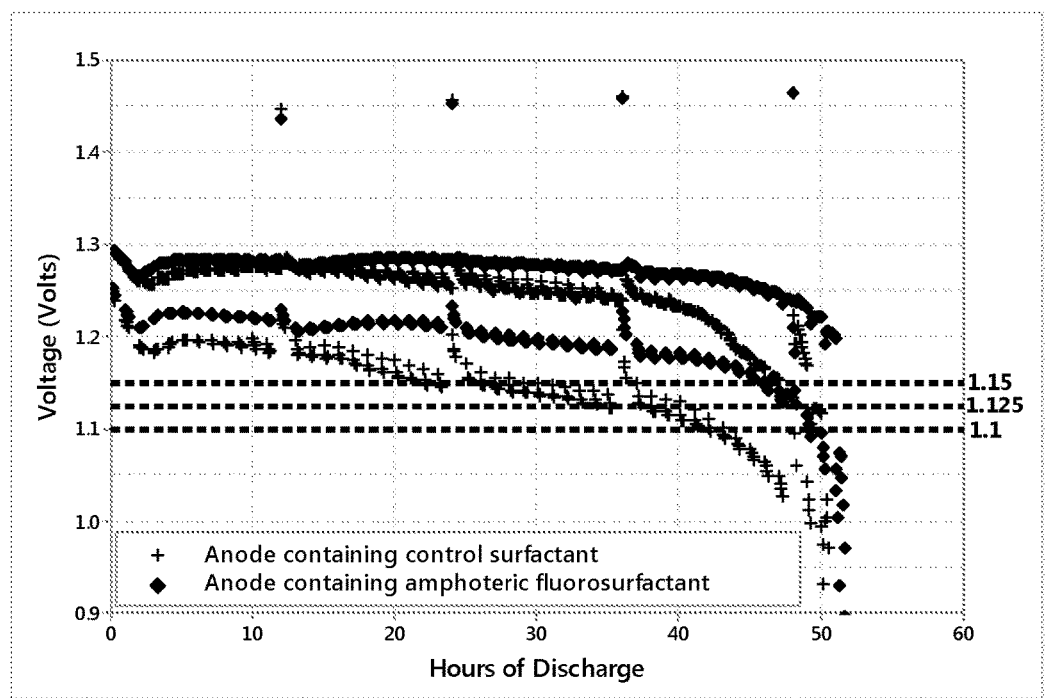
FIG. 3 is a wireless streaming pulse discharge curve comparison between a control anode (containing a control surfactant) and an anode containing 4000 ppm of an amphoteric fluorosurfactant at 4-month room temperature delay, according to the examples.
Figure 4:
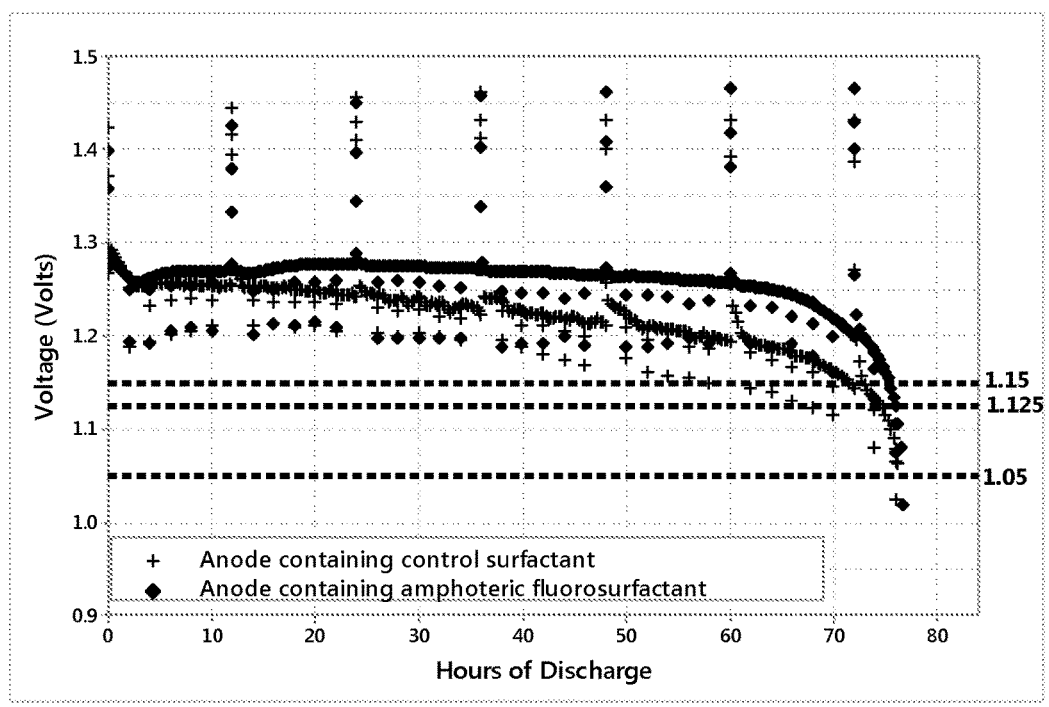
FIG. 4 is a hearing aid standard pulse discharge curve comparison between a control anode (containing a control surfactant) and an anode containing 10000 ppm of an amphoteric fluorosurfactant at 4-month room temperature delay, according to the examples.
Figure 5:
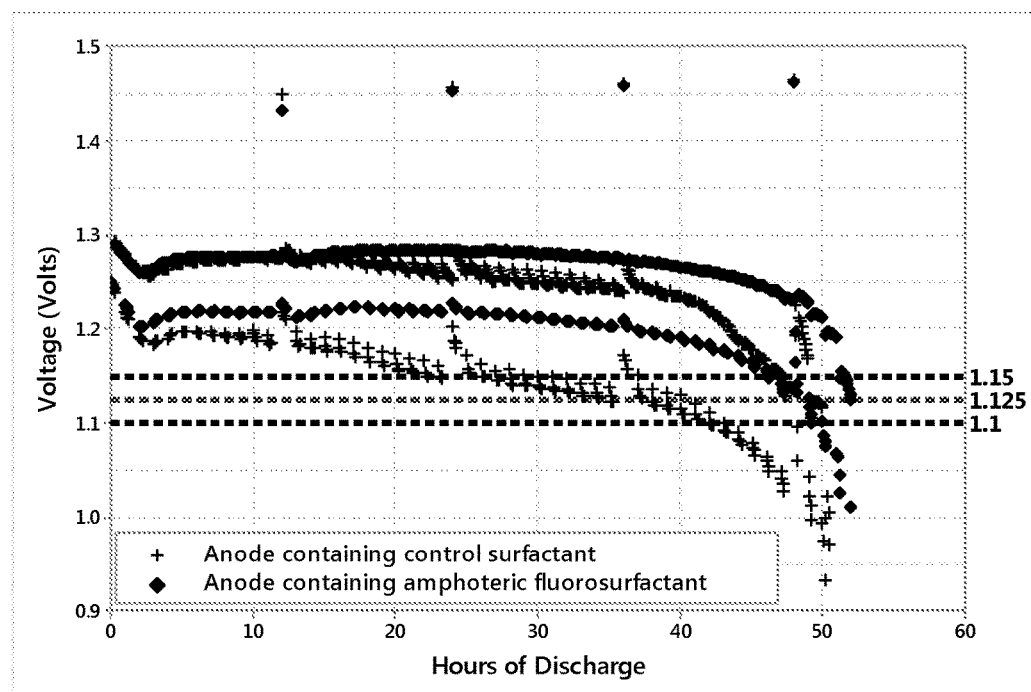
FIG. 5 is a wireless streaming pulse discharge curve comparison between a control anode (containing a control surfactant) and an anode containing 10000 ppm of an amphoteric fluorosurfactant at 4-month room temperature delay, according to the examples.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

In general, "substituted" refers to an alkyl, alkenyl, alkynyl, aryl, or ether group, as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

As used herein, "alkyl" groups include straight chain and branched alkyl groups having from 1 to about 20 carbon atoms, and typically from 1 to 12 carbons or, in some embodiments, from 1 to 8 carbon atoms. Alkyl groups may be substituted or unsubstituted. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, neopentyl, isopentyl, 1,1,3,3-tetramethylbutyl and 2,2,4,4-tetramethylpentyl groups. Representative substituted alkyl groups may be substituted one or more times with, for example, amino, thio, hydroxy, cyano, alkoxy, and/or halo groups such as F, Cl, Br, and I groups. As used herein the term haloalkyl is an alkyl group having one or more halo groups. In some embodiments, haloalkyl refers to a per-haloalkyl group.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 6, or 7. Cycloalkyl groups may be substituted or unsubstituted. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined above. Representative substituted cycloalkyl groups may be mono-substituted or substituted more than once, such as, but not limited to: 2,2-; 2,3-; 2,4-; 2,5-; or 2,6-disubstituted cyclohexyl groups or mono-, di-, or tri-substituted norbornyl or cycloheptyl groups, which may be substituted with, for example, alkyl, alkoxy, amino, thio, hydroxy, cyano, and/or halo groups.

Alkenyl groups are straight chain, branched or cyclic alkyl groups having 2 to about 20 carbon atoms, and further including at least one double bond. In some embodiments alkenyl groups have from 1 to 12 carbons, or, typically, from 1 to 8 carbon atoms. Alkenyl groups may be substituted or unsubstituted. Alkenyl groups include, for instance, vinyl, propenyl, 2-butenyl, 3-butenyl, isobutenyl, cyclohexenyl, cyclopentenyl, cyclohexadienyl, butadienyl, pentadienyl, and hexadienyl groups among others. Alkenyl groups may be substituted similarly to alkyl groups. Divalent alkenyl groups, i.e., alkenyl groups with two points of attachment, include, but are not limited to, CH—CH=CH$_2$, C=CH$_2$, or C=CHCH$_3$.

The term "alkoxy group" refers to a hydroxy group (OH) in which the H has been replaced by an alkyl group comprising from 1 to 12 carbon atoms as defined herein. In some embodiments, the alkoxy group comprises 1 to 7 or 1 to 4 carbon atoms. The alkoxy group may be, e.g., a methoxy group, an ethoxy group, a propoxy group, a isopropoxy group, a n-butoxy group, a sec-butoxy group, tert-butoxy group, pentoxy group, isopentoxy group, 3-methylbutoxy group, 2,2-dimethylpropoxy group, n-hexyloxy group, 2-methylpentoxy group, 2,2-dimethylbutoxy group, 2,3-dimethylbutoxy group, n-heptoxy group, 2-methylhexoxy group, 2,2-dimethylpentoxy group, 2,3-dimethylpentoxy group, cyclopropoxy group, cyclobutoxy group, cyclopentyloxy group, cyclohexyloxy group, cycloheptyloxy group, 1-methylcyclopropyl oxy group and others. In some embodiments, the alkoxy group comprises O—C$_1$-C$_6$-alkyl groups. In other embodiments, the alkoxy group comprises O—C$_1$-C$_4$-alkyl groups.

The term "amine" (or "amino") as used herein refers to —NR$^{100}$R$^{101}$ groups, wherein R$^{100}$ and R$^{101}$ are independently hydrogen, or a substituted or unsubstituted alkyl, alkenyl, alkynyl, cycloalkyl, aryl, aralkyl, heterocyclylalkyl or heterocyclyl group as defined herein. In some embodiments, the amine is alkylamino, dialkylamino, arylamino, or alkylarylamino. In other embodiments, the amine is NH$_2$, methylamino, dimethylamino, ethylamino, diethylamino, propylamino, isopropylamino, phenylamino, or benzylamino.

The term "halogen" or "halo" as used herein refers to bromine, chlorine, fluorine, or iodine. In some embodiments, the halogen is fluorine. In other embodiments, the halogen is chlorine or bromine.

The term "hydroxyl" as used herein can refer to —OH or its ionized form, —O—.

The term "nitrile" or "cyano" as used herein refers to the —CN group.

The term "thio" as used herein refers to a —S— group or an ether wherein the oxygen is replaced with sulfur.

As used herein, the term "cationic fluorosurfactants" refers to fluorosurfactants containing cationic groups and/or groups able to be protonated into cationic groups. In some embodiments, the cationic fluorosurfactant comprises primary, secondary, tertiary, and/or quaternary amine groups.

As used herein, the term "anionic fluorosurfactants" refers to fluorosurfactants containing anionic groups and/or groups able to be deprotonated into anionic groups. In some embodiments, the anionic fluorosurfactant comprises carboxy group(s), sulfonic group(s), phosphate group(s), phosphonate group(s) or their corresponding salts.

As used herein, the term "amphoteric fluorosurfactants" refers to fluorosurfactants containing at least one cationic group and at least one anionic group as defined above for cationic and anionic fluorosurfactants. In some embodiments, the amphoteric fluorosurfactant is CHEMGUARD® S-111 (a short-chain perfluoro-based amphoteric fluorosurfactant of the alkyl amine oxide type), CHEMGUARD® S-500 (short-chain perfluoro-based amphoteric fluorosurfactant), CAPSTONE® FS-50 (a betaine partially fluorinated surfactant), CAPSTONE® FS-51 (an amine oxide partially fluorinated surfactant), APFS-14 (an amphoteric, polyfluoroalkyl betaine surfactant), DYNAX DX3001 (an amphoteric fluorochemical surfactant of the perfluoroalkyl-betaine type), ZONYL® FSK (a sparingly water-soluble, ethoxylated nonionic fluorosurfactant), ZONYL® FS-500 (a betaine fluorinated amphoteric surfactant), or a combination of any two or more thereof.

As used herein, the term "betaine functionality" refers to a neutral compound with a positively charged cationic functional group and a negatively charged functional group. In some embodiments, the cationic functional group may be a quaternary ammonium or phosphonium cation, which bears no hydrogen atom. In some embodiments, the negatively charged functional group may be a carboxylate group.

As used herein, the term "short-chain perfluoro substituent" refers to a C$_1$-C$_7$ perfluoro substituent.

As used herein, the term "zinc anode" refers to an anode that includes zinc as an anode active material.

As used herein, the term "ppm" means parts per million by weight, unless explicitly expressed otherwise.

It has now been found that the use of amphoteric fluorosurfactants and surfactants of Formula (II) (vide infra) in zinc-air batteries provide for improvements in the operating voltage of such batteries when operated at high drain rates, such as those encountered during pulsed discharge. Improvements in voltage eliminate, or at least substantially decrease, the occurrence of low battery signals. It is believed that this effect is provided by increasing the operating voltage relative to the cut-off voltage of the battery.

In one embodiment, the zinc-air batteries that include amphoteric fluorosurfactants or surfactants of Formula (II) may be used in a hearing aid. Hearing aids are programmed to trigger a 'low battery' alarm once the battery operating voltage has hit or dropped below a critical threshold. This threshold voltage is higher for advanced hearing aids, especially those that support wireless streaming. Accordingly, it is desirable for the hearing aid battery to be capable of sustaining the operating voltage above any prescribed cut-off, e.g., 1.1 V, 1.125 V or 1.15 V. It has been determined that the operating voltage for a zinc-air battery including an amphoteric fluorosurfactant for Formula (I) or surfactants of Formula (II), stays above the ANSI mandated cut-off of 1.05 V longer throughout the hearing aid standard pulse discharge when compared to a zinc-air battery containing the control surfactant. In comparison, the control is not capable of sustaining voltages above 1.15 V. It has also been determined that operating voltage for a zinc-air battery including an amphoteric fluorosurfactant for Formula (I), stays above the ANSI mandated cut-off of 1.1 V throughout the wireless streaming pulse discharge. In comparison, the control is not capable of sustaining voltages above 1.15 V.

The amphoteric fluorosurfactants or surfactants of Formula (II) are included in the anode (i.e. negative electrode) side of the battery. Without being bound by theory, it is believed that the amphoteric fluorosurfactants or surfactants of Formula (II) interact with the zinc in the anode thereby significantly raising the operating voltage of the battery, as compared to a battery employing a control surfactant (i.e. a non-fluorinated surfactant or not of Formula (II)). The higher operating voltage allows for the zinc-air battery anode to exhibit better performance characteristics than a control battery (i.e. one without the amphoteric fluorosurfactant or surfactants of Formula (II)), particularly when the batteries are discharged under pulsed conditions to higher end points.

During pulsed discharge, electrical energy is supplied by the zinc-air battery in pulsed form. This type of discharge results in a high load being placed on the battery by the device in which the battery is located. In some embodiments, the device is a hearing aid. Batteries in such devices need to desirably exhibit a high and stable operating voltage for a majority of the discharge life, so as to avoid, or at least minimize, the occurrence of triggering a low-battery signal from the device. The voltage threshold for the low battery signal may vary from one device (i.e. hearing aid) to another.

In one aspect, a zinc-air battery is provided including an air cathode, a zinc anode, and an electrolyte, wherein the electrolyte includes an amphoteric fluorosurfactant. The amphoteric fluorosurfactant may include a short-chain perfluoro substituent that does not degrade to form perfluorooctanoic acid. In one embodiment of the present disclosure, the amphoteric fluorosurfactant includes a betaine functionality.

The amphoteric fluorosurfactant may be a compound represented by Formula (I):

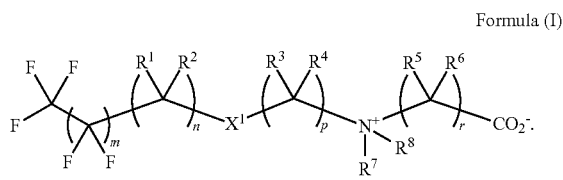

Formula (I)

In Formula (I) $R^1$, $R^2$, $R^3$, $R^4$, $R^5$, $R^6$, $R^7$, and $R^8$ are each independently a hydrogen, alkyl, alkenyl, or cycloalkyl group; $X^1$ is —C(O)—, —SO$_2$—, —C(O)NR$^a$—, —SO$_2$NR$^a$—, —CO$_2$—, or —SO$_2$O—; $R^a$ is H or an alkyl group; m and p are each independently 0, 1, 2, 3, 4, 5, or 6; and n and r are each independently 1, 2, 3, 4, or 5. In some embodiments, $R^1$-$R^6$ are H, $R^7$ and $R^8$ are $C_1$-$C_4$ alkyl, n and p are 2, m is from 4 to 6, $X^1$ is SO$_2$, and r is 1. In some embodiments, $R^a$ is H. In other embodiments, $R^a$ is $C_1$-$C_6$ alkyl.

Suitable amphoteric fluorosurfactants may be prepared by methods known in the art or may be commercially available, and may include perfluorosurfactants or polyfluoroalkyl betaine surfactant alone or in combination with other components such as water, ethanol, methanol, propylene glycol, diethylene glycol mono butyl ether, sodium chloride, acetic acid Illustrative amphoteric fluorosurfactants include, but are not limited to, CHEMGUARD® S-111, CHEMGUARD® S-500, CAPSTONE® FS-50, CAPSTONE® FS-51, APFS-14, DYNAX DX3001, ZONYL® FSK, ZONYL® FS-500, or a combination of any two or more thereof. In some embodiments, the surfactant system includes at least one amphoteric fluorosurfactant. In some embodiments, the surfactant system includes at least two amphoteric fluorosurfactant.

Without being bound by theory, it is believed that the amphoteric fluorosurfactant reduces voltage suppression while maintaining gassing reliability.

The amphoteric fluorosurfactant may be present in the electrolyte from about 200 ppm to about 20000 ppm, based on the total weight of the electrolyte. In another embodiment, the amphoteric fluorosurfactant is present in the electrolyte from about 2000 ppm to about 15000 ppm. In another embodiment, the amphoteric fluorosurfactant concentration in the electrolyte is about 3000 ppm to about 12000. In one embodiment, the amphoteric fluorosurfactant concentration in the electrolyte is about 4000 ppm to about 10000. In one embodiment, the amphoteric fluorosurfactant concentration in the electrolyte is about 4000 ppm. In another embodiment, the amphoteric fluorosurfactant concentration in the electrolyte is about 10000 ppm.

In another aspect, a zinc-air battery is provided including an air cathode, a zinc anode, and an electrolyte, wherein the electrolyte includes a surfactant of Formula (II)

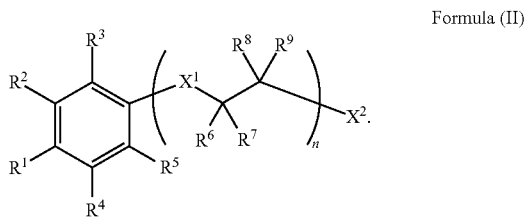

Formula (II)

In Formula (II), $R^1$, $R^2$, $R^3$, $R^4$, $R^5$, $R^6$, $R^7$, $R^8$, and $R^9$ are each independently a hydrogen, substituted or unsubstituted alkyl, alkenyl, or cycloalkyl group; $X^1$ is O or S; $X^2$ is OH or SH; and n is 5-50.

In some embodiments of Formula (II), $R^1$ is a $C_1$-$C_{12}$ alkyl group; $R^2$, $R^3$, $R^4$, $R^5$, $R^6$, $R^7$, $R^8$, and $R^9$ are each hydrogen; $X^1$ is O; $X^2$ is OH; and n is 5-15. In some embodiments, $R^1$ is octyl and n is 5-10. In some embodiments, $R^1$ is a $C_1$-$C_{12}$ alkyl group, for example octyl or 1,1,3,3-tetramethylbutyl. In some embodiments, $R^1$ is octyl. In some embodiments, $R^1$ is 1,1,3,3-tetramethylbutyl or n-octyl. In some embodiments, $R^2$, $R^3$, $R^4$, $R^5$, $R^6$, $R^7$, $R^8$, and $R^9$ are each hydrogen. In some embodiments, $X^1$ is O. In some embodiments, $X^2$ is OH. In some embodiments, n is 5-15. In some embodiments, n is 5-10. In another embodiment, $R^1$ is 1,1,3,3-tetramethylbutyl or n-octyl and n is 5-10. In another embodiment, $R^1$ is 1,1,3,3-tetramethylbutyl and n is 5-10.

In some embodiments of Formula (II), $R^1$ is a $C_1$-$C_{12}$ alkyl group; $R^2$, $R^3$, $R^4$, $R^5$, $R^6$, $R^7$, $R^8$, and $R^9$ are each hydrogen; $X^1$ is O; $X^2$ is OH; and n is 5-15. In some embodiments, $R^1$ is octyl and n is 5-10. In another embodiment, $R^1$ is 1,1,3,3-tetramethylbutyl and n is 5-10.

Illustrative surfactants represented by Formula (II) include, but are not limited to, Igepal® CA-630, Triton® X-100, or a combination thereof. In some embodiments, the surfactant includes at least one surfactant of Formula (II). In some embodiments, the surfactant includes at least two surfactants of Formula (II).

The surfactant of Formula (II) may reduce voltage suppression while maintaining gassing reliability.

The surfactant of Formula (II) may be present in the electrolyte from about 200 ppm to about 20,000 ppm, based upon the total weight of the electrolyte. In another embodiment, the surfactant of Formula (II) is present in the electrolyte from about 2000 ppm to about 15000 ppm. In another embodiment, the surfactant of Formula (II) concentration in the electrolyte is about 3000 ppm to about 12000. In one embodiment, the surfactant of Formula (II) concentration in the electrolyte is about 4000 ppm.

While the electrolytes described herein may be based upon the amphoteric fluorosurfactants or the surfactants of Formula (II), or combinations including one or both, the electrolytes may commonly include other additives to the surfactant system.

In one embodiment, the electrolyte may further include a corrosion inhibitor (i.e., indium hydroxide, polyaniline, polyethylene glycol, polypropylene glycol, or lithium hydroxide), a gelling agent (i.e., polyacrylate polymer), gas suppressing additive (i.e., zinc oxide, aluminum hydroxide, or calcium bromide), potassium hydroxide, sodium hydroxide, lead acetate, bismuth oxide, cesium hydroxide, functional additives (i.e., boric acid, sodium borate, potassium borate, sodium stannate, potassium stannate), or a combination of any two or more thereof.

The electrolyte may further include a second surfactant that may be, but is not limited to, hexyl diphenyl oxide disulfonic acid, diethylenetriamine, octylphenoxypolyethoxyethanol, a compound of Formula (III), a compound, or a combinations of any two or more thereof.

Compounds of Formula (III) include:

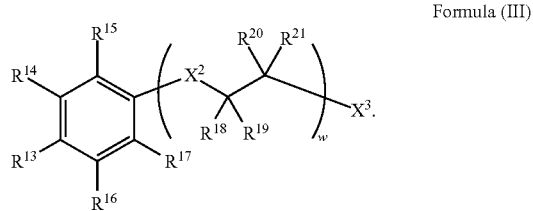

Formula (III)

In Formula (III), $R^{13}$, $R^{14}$, R, $R^{16}$, $R^{17}$, $R^{18}$, $R^{19}$, $R^{20}$, and $R^{21}$ are each independently a hydrogen, alkyl, alkenyl, or cycloalkyl group; $X^2$ is O or S; $X^3$ is OH or SH; and w is 5-50. In some embodiments, $R^{13}$, $R^{14}$, $R^{15}$, $R^{16}$, $R^{17}$, $R^{18}$, $R^{19}$, $R^{20}$, and $R^{21}$ are each hydrogen. In some embodiments, $X^2$ is O. In some embodiments, $X^3$ is OH. In some embodiments, w is 5-15. In some embodiments, w is 5-10. In some embodiments, $R^{13}$ is a $C_1$-$C_{12}$ alkyl group; $R^{14}$, $R^{15}$, $R^{16}$, $R^{17}$, $R^{18}$, $R^{19}$, $R^{20}$, and $R^{21}$ are each hydrogen; $X^2$ is O; $X^3$ is OH; and w is 5-15. In some embodiments, $R^{13}$ is octyl and w is 5-10. In another embodiment, $R^{13}$ is 1,1,3,3-tetramethylbutyl and w is 5-10.

In one embodiment, the electrolyte includes a combination of hexyl diphenyl oxide disulfonic acid and at least one amphoteric fluorosurfactant. In another embodiment, the electrolyte includes a combination of diethylenetriamine and at least one amphoteric fluorosurfactant. In another embodiment, the electrolyte includes a combination of octylphenoxypolyethyoxyethanol and at least one amphoteric fluorosurfactant.

In one embodiment, the electrolyte includes a combination of hexyl diphenyl oxide disulfonic acid and at least one surfactant of Formula (II). In another embodiment, the electrolyte includes a combination of diethylenetriamine and at least one surfactant of Formula (II). In another embodiment, the electrolyte includes a combination of octylphenoxypolyethyoxyethanol and at least one surfactant of Formula (II).

The hexyl diphenyl oxide disulfonic acid surfactant is believed to assist in reducing voltage suppression. The hexyl diphenyl oxide disulfonic acid surfactant may have a density of from about 9.0 to about 10.0 lbs/gallon. In one embodiment, the hexyl diphenyl oxide disulfonic acid surfactant has a density of about 9.8 lbs/gallon. The hexyl diphenyl oxide disulfonic acid surfactant may have a pH of less than about 2.0. The hexyl diphenyl oxide disulfonic acid surfactant may have a solubility of about 50% in water.

The hexyl diphenyl oxide disulfonic acid surfactant may include from about 70% to about 75%, by weight, of a sulfonated benzene, 1,1'-oxybis-sec-hexyl derivative. The hexyl diphenyl oxide disulfonic acid surfactant may include from about 0% to about 5% or from about 2% to about 4%, by weight, of sulfuric acid. In another embodiment, the hexyl diphenyl oxide disulfonic acid surfactant may include from about 20% to about 30% or from about 22% to about 28%, by weight, of water. Illustrative hexyl diphenyl oxide disulfonic acid surfactants may include, but is not limited to, Calfax® 6LA-70, available from Pilot Chemical Company. Because Calfax® 6LA-70 is a surfactant, it can also act as a coupling agent and/or an HLB modifier. Thus, the term "surfactant" is not to be seen in a limiting sense for the Calfax® 6LA-70, but, rather, is a description of one of the functions that hexyl diphenyl oxide disulfonic acids may provide.

The hexyl diphenyl oxide disulfonic acid surfactant may be present in an amount from about 500 ppm to about 5000 ppm, based on the total weight of the electrolyte. This may include from about 1000 ppm to about 4000 ppm or about 2000 ppm to about 3000 ppm. In another embodiment, the hexyl diphenyl oxide disulfonic acid surfactant is present in an amount of about 1000 ppm, about 2000 ppm, about 3000 ppm, about 4000 ppm, or about 5000 ppm, or ranges between any two of these values (including endpoints). In one embodiment, the hexyl diphenyl oxide disulfonic acid surfactant is present in an amount of about 3000 ppm. In another embodiment, the hexyl diphenyl oxide disulfonic acid surfactant is present in an amount of about 4,500 ppm.

The electrolyte may further include a corrosion inhibitor. It is believed that the corrosion inhibitor maintains a clean zinc surface, which in turn increases cell voltage and efficiency. In some embodiments, both the corrosion inhibitor and the fluorosurfactant may provide improvements in cell voltage and cell performance. In another embodiment, the corrosion inhibitor may enhance conductivity. In some embodiments, both the corrosion inhibitor and the surfactant of Formula (II) may provide improvements in cell voltage and cell performance.

The corrosion inhibitor may be either a solid or a liquid and may or may not be soluble in the solvent(s) of the electrolyte. The corrosion inhibitor may be present in the electrolyte from about 100 ppm to about 25000 ppm. This may include from about 200 ppm to about 300 ppm. In another embodiment, the corrosion inhibitor is present in an amount of about 150 ppm, about 200 ppm, about 250 ppm, about 300 ppm, about 350 ppm, about 500 ppm, about 1000 ppm, about 5000 ppm, about 10000 ppm, about 20000 ppm, about 25000 ppm, or ranges between any two of these values (including endpoints). In some embodiment, the corrosion inhibitor is present in an amount of about 250 ppm. In another embodiment, the corrosion inhibitor is present in an amount of about 10000 ppm to about 20000 ppm. With regard to the corrosion inhibitor only, the ppm amount is based upon the total weight of the electrolyte when the corrosion inhibitor is a liquid at room temperature, or it is based upon the zinc weight in the anode when the corrosion inhibitor is a solid at room temperature.

In one embodiment, the corrosion inhibitor is an aromatic amine polymer, indium hydroxide, polyaniline, polyethylene glycol, polypropylene glycol, lithium hydroxide, or a combination of any two or more thereof. In some embodiments, the corrosion inhibitor is a compound of Formula (IV):

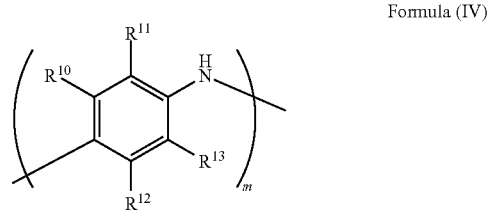

Formula (IV)

wherein $R^{10}$, $R^{11}$, $R^{12}$, and $R^{13}$ are each independently a hydrogen, substituted or unsubstituted alkyl, substituted or unsubstituted alkenyl, or substituted or unsubstituted cycloalkyl group; and m is 100-500. In some embodiments, $R^{10}$, $R^{11}$, $R^{12}$, and $R^{13}$ are each hydrogen. In some embodiments, m is 100-200. In some embodiments, $R^{10}$, $R^{11}$, $R^{12}$, and $R^{13}$ are each hydrogen and m is 100-200.

In another embodiment the corrosion inhibitor is polyaniline. In some embodiments, the polyaniline corrosion inhibitor is an emeraldine polyaniline. In another embodiment, the polyaniline is a non-acid doped form of polyaniline and is not a conductive form of polyaniline. In some embodiments, the emeraldine form of polyaniline is neutral and has a high stability at room temperature. In some embodiments, the polyaniline may act as a corrosion inhibitor. However, the polyaniline may provide other benefits in addition to being a corrosion inhibitor. For example, in some embodiments the polyaniline may enhance the conductivity of the cell.

In one embodiment, the corrosion inhibitor is indium hydroxide. In some embodiments, the indium hydroxide may be present in an amount from about 2000 ppm to about 4000 ppm based upon the total weight of zinc in the anode. This may include from about 2,500 ppm to about 3,500 ppm, or from about 2,750 ppm to about 3,250 ppm based upon the total weight of the zinc in the anode. In another embodiment, the indium hydroxide may be present in an amount of about 2000 ppm, about 2,500 ppm, about 3000 ppm, about 3,500 ppm, about 4000 ppm, or ranges between any two of these values (including endpoints) based upon the total weight of the zinc in the anode. In another embodiment, the indium hydroxide may be present in an amount of about 3000 ppm based upon the total weight of zinc in the anode.

The electrolyte may also include a gelling agent. Any suitable gelling agent in the art may be used so long as it does not depart from the scope of the present disclosure. In one embodiment, the gelling agent may be present in an amount from about 500 ppm to about 1,500 ppm, about 750 ppm to about 1,250, or about 900 ppm to about 1,100 ppm, based upon the total weight of the electrolyte. In another embodiment, the gelling agent is present in an amount of about 500 ppm, about 600 ppm, about 700 ppm, about 800 ppm, about 900 ppm, about 1000 ppm, about 1,100 ppm, about 1,200 ppm, about 1,300 ppm, about 1,400 ppm, or about 1,500 ppm, or ranges between any two of these values (including endpoints). In another embodiment, the gelling agent is present in an amount of about 1000 ppm. In one embodiment, a suitable gelling agent is a polyacrylic acid polymer. In one embodiment, the gelling agent is a cross-linked polyacrylic acid polymer.

The electrolyte may include a gas suppressing additive. In one embodiment, the electrolyte may include from about 500 ppm to about 20000 ppm of a gas suppressing additive. In one embodiment, the gas suppressing additive is zinc oxide.

When used, the zinc oxide may be present in an amount from about 1% to about 10%, by weight of the electrolyte. This may include about 1% to about 8%, 1% to about 5%, about 1.5 to about 5%, or about 2 to about 5%, by weight of the electrolyte. In one embodiment, the zinc oxide may be present in an amount of about 1%, about 1.5%, about 2%, about 2.5%, about 3%, about 3.5%, or about 4%, by weight of the electrolyte, or ranges between any two of these values (including endpoints). In one embodiment, the zinc oxide may be present in an amount of about 2%, by weight of the electrolyte. In some embodiments, the zinc oxide may provide other benefits that do not limit the zinc oxide to acting just as a gas suppressing additive. Thus, referring to the zinc oxide as a "gas suppressing additive" does not limit the zinc oxide to only that particular function. For example, in some embodiments the zinc oxide regulates zinc surface passivation.

The electrolyte may include potassium hydroxide. In one embodiment, the potassium hydroxide is present in an amount from about 20% to about 45%, by weight of the electrolyte. This may include from about 25% to about 40% or from about 30% to about 35%, by weight of the electrolyte. In one embodiment, the potassium hydroxide is present in an amount of about 45%, about 30%, about 25%, or about 20%, by weight of the electrolyte, or ranges between any two of these values (including endpoints). In another embodiment, the potassium hydroxide is present in an amount of about 30% to about 40%, by weight of the electrolyte.

The electrolyte may include sodium hydroxide. In one embodiment, the sodium hydroxide is present in an amount from about 20% to about 45%. This may include from about 25% to about 40% or from about 30% to about 35%, by weight of the electrolyte. In one embodiment, the sodium hydroxide is present in an amount of about 45%, about 30%, about 25%, or about 20%, by weight of the electrolyte, or ranges between any two of these values (including endpoints). In another embodiment, the sodium hydroxide is present in an amount of about 30% to about 40%, by weight of the total electrolyte.

In one embodiment, the zinc-air battery includes an electrolyte, wherein the electrolyte includes a surfactant system and a corrosion inhibitor. In some embodiments, the surfactant system includes an amphoteric fluorosurfactant. In another embodiment, the surfactant system further includes a gas suppressing additive. In another embodiment, the surfactant system further includes hexyl diphenyl oxide disulfonic acid, diethylenetriamine, or octylphenoxypolyethoxyethanol, a compound of Formula (III), or a combination of any two or more thereof.

The zinc-air battery may include an electrolyte, wherein the electrolyte includes a surfactant of Formula (I) and a corrosion inhibitor. In another embodiment, the electrolyte further includes a gas suppressing additive. In another embodiment, the electrolyte further includes a hexyl diphenyl oxide disulfonic acid surfactant.

The negative electrode includes an anode, an anode active material, and an anode can assembly that surrounds the active material. In some embodiments, the anode active material includes zinc and the anode is referred to as a "zinc anode." In this regard, it is to be noted that, as used herein, anode "active material" may refer to a single chemical compound that is part of the discharge reaction at the anode of a cell and contributes to the cell discharge capacity, including impurities and small amounts of other moieties that may be present therein. Anode "active material" does not include current collectors, electrode leads, etc., that may contain or support the zinc active material. In some embodiments, the anode includes alloys of zinc with other metals. Zinc alloys may include alloying elements intended to raise the overpotential for hydrogen evolution to minimize the generation of hydrogen within the anode. In some embodiments, the zinc may be alloyed with one or more metals selected from indium, bismuth, calcium, aluminum, magnesium, and lead. In some embodiments, the alloying metal is bismuth. In some embodiments, the zinc alloy includes zinc, bismuth, and indium. In some embodiments, the zinc alloy includes zinc, bismuth, indium, and aluminum. In some embodiments, the zinc alloy includes zinc, lead, indium, and aluminum.

An anode may be provided that includes a combination of electrolyte components. In some embodiments, the electrolyte includes at least one surfactant, in addition to one or more of a corrosion inhibitor, a gelling agent, gas suppressing additive, such as for example, potassium hydroxide, sodium hydroxide, lead acetate, bismuth oxide, calcium bromide, cesium hydroxide, functional additives such as boric acid, sodium borate, potassium borate, sodium stannate, and potassium stannate. In one embodiment, the at least one surfactant is an amphoteric fluorosurfactant. Illustrative amphoteric fluorosurfactant include, but are not limited to, CHEMGUARD® S-111, CHEMGUARD® S-500, CAPSTONE® FS-50, CAPSTONE® FS-51, APFS-14, DYNAX DX3001, or a combination of any two or more thereof. In one embodiment, the at least one surfactant is a surfactant of Formula (II). Illustrative surfactants include, but are not limited to, IGEPAL® CA-630, TRITON® X-100, or a combination thereof. In some embodiments, the surfactant may include an amphoteric fluorosurfactant in combination with a surfactant of Formula (II). The combination of the components in the anode may provide an improvement in cell voltage and cell performance.

In one embodiment, the anode is prepared by a two-step process (a) dry zinc blending and (b) electrolyte preparation. The blended zinc may be dispensed into the anode can cavity followed by the electrolyte in set proportions which may vary as per cell size. In some embodiments, the dry zinc blending step includes admixing zinc or zinc alloy, a gelling agent, and a corrosion inhibitor. In some embodiments, a small concentration of water may be added to the admixture to facilitate blending and the water may be subsequently dried off.

In one embodiment, the dry zinc blend includes a mixture of a zinc alloy, a gelling agent, a corrosion inhibitor and optionally other additives. In one embodiment, the electrolyte includes alkali metal hydroxide with water, a corrosion inhibitor, a surfactant, a gelling agent, and optionally other additives. The weight ratio of zinc blend to the electrolyte can range from about 6 parts zinc to 1 part electrolyte to about 3 parts zinc to 1 part electrolyte.

Suitable zinc based alloys are described herein. In one embodiment, the zinc alloy is an alloy of and active agent such as zinc (Zn), with other alloying agents such as lead (Pb), indium (In) bismuth (Bi), calcium (Ca), magnesium (Mg) and aluminum (Al). Specific alloying agents may be selected based on the desired properties and performance. Some combinations of alloying materials may work better with zinc than others. The amount of various alloying agents can be varied depending on the desired properties. For example, the concentrations of the alloying agents may range from about 20 ppm to about 750 ppm, including from about 50 ppm to about 100 ppm, about 100 ppm to about 300 ppm, about 300 ppm to about 400 ppm or about 400 ppm to about 600 ppm, and ranges between any two of these values or less than any one of these values. In some embodiments, the alloying agent is present at a concentration of about 50 ppm to 550 ppm. Typically, alloy materials may include from about 0.01% to about 0.5% by weight of an active agent alone, or in combination with, from about 0.005% to about 0.2% by weight of one or more alloying agent. In one embodiment, the alloy includes from about 400 ppm to about 600 ppm of Pb, about 100 ppm to about 300 ppm of In and about 50 ppm to about 100 ppm Al. Concentrations of components are specified based on the total zinc weight in the anode.

Any suitable gelling agent may be used so long as it does not depart from the scope of the present disclosure. Suitable gelling agents include, but are not limited to, polyacrylic acid polymers, grafted starch materials, salts of polyacrylic acids, crosslinking-typed branched polyacrylates, carboxymethyl cellulose, natural gum, and the like or combinations thereof. Examples of suitable polyacrylic acid polymers include Carbopol® 940 Carbopol® 934, and Carbopol® ETD2050 (originally manufactured by B.F. Goodrich, available from Lubrizol) and Polygel 4P (available from 3V). In some embodiments, the gelling agent is Carbopol® 934. In other embodiments, the gelling agent is Carbopol® ETD2050. An example of a grafted starch material is Waterlock A221 (available from Grain Processing Corporation). In one embodiment, a suitable gelling agent is a polyacrylic acid polymer. In one embodiment, a suitable gelling agent is a cross-lined polyacrylic acid polymer. In some embodiments a salt of a polycrylic acid polymer also know as a superabsorbent may be used. The superabsorbent consists of unfirmly shaped particles which are believed to improve discharge performance and shock sensitivity within the anode. An example of a salt of a polyacrylic acid is Flocare® GB300 (available from SNF Group). In some embodiments, the gelling agent does not include sodium polyacrylate gelling agent. In some embodiments, the gelling agent is an agent other than the sodium polyacrylate gelling agent.

Suitable corrosion inhibitors include for example, a clay-based inorganic corrosion inhibitor and an inorganic corrosion inhibitor. Exemplary clay-based inorganic corrosion inhibitors include natural or synthetic, layered silicate clays such as laponite, montmorillonite, bentonite or smectite or other clay like materials. In one embodiment, the clay-based inorganic corrosion inhibitor is Laponite-RDS (available from BYK Additives and Instruments). Suitable inorganic corrosion inhibitors are described herein. The clay-based corrosion inhibitor may be present in an amount of from about 10 ppm to about 30000 ppm. This includes from about 50 ppm to about 20000 ppm, from about 500 ppm to about 15000 ppm, from about 1000 ppm to about 10000 ppm, or about from about 2000 ppm to about 5000 ppm, and ranges between any two of these values or less than any one of these values. The total amount of corrosion inhibitor typically ranges from about 0.001% to about 10% by weight of the anode. This includes from about 0.01% to about 5% by weight, about 0.1% to about 4% by weight, about 0.5% to about 3% by weight, or about 1% to about 2%, by weight relative to the weight of the anode, and ranges between any two of these values or less than any one of these values.

In an exemplary embodiment, the dry zinc blend includes mixing a Zn—Pb—In—Al alloy (98.99% ppm) with a cross-linked polyacrylic acid based gelling agent (0.30%), clay additive (0.20%), indium hydroxide (0.3%) and polytetrafluoroethylene (PTFE) powder (0.03%).

In some embodiments, the electrolyte preparation includes combining an alkali metal hydroxide with water, a corrosion inhibitor, a surfactant and a gelling agent. Suitable alkali metal hydroxides include potassium hydroxide (KOH), lithium hydroxide (LiOH) or sodium hydroxide (NaOH). In some embodiments, the alkali metal hydroxide is KOH.

In some embodiments, the electrolyte includes LiOH which functions both as an alkaline electrolyte material and as a corrosion inhibitor. In some embodiments, the lithium hydroxide may be present in an amount from about 2000 ppm to about 40000 ppm based upon the total weight of the electrolyte. This may include from about 5000 ppm to about 35000 ppm, from about 7500 ppm to about 30000 ppm or from about 10000 ppm to about 20000 ppm based upon the total weight of the electrolyte, or ranges between any two of these values (including endpoints) based upon the total weight of the zinc in the anode. In another embodiment, the lithium hydroxide may be present in an amount of about 10000 ppm to about 20000 ppm based upon the total weight of electrolyte.

In some embodiments, the electrolyte components include, but are not limited to, KOH, de-ionized water, lithium hydroxide, an amphoteric surfactant and a gelling agent. In some embodiments, the gelling agent is Carbopol® ETD2050. In some embodiments, the electrolyte components include, KOH, de-ionized water, lithium hydroxide, amphoteric surfactant and Carbopol® ETD2050 gelling agent. In some embodiments, the amount of LiOH is about 10000 ppm to about 20000 ppm based on the total electrolyte weight. In some embodiments, the amount of the amphoteric surfactant described herein is about 4000 ppm to about 15000 ppm based on the total electrolyte weight.

Physical modifications to the anode may also improve cell service life, either alone or in combination with chemical modifications noted above. For example, one can efficiently discharge cells having an advantageously lower concentration of hydroxide ions in the electrolyte than can be used in conventional cells by reducing diffusion resistance for the hydroxide ions. This can be accomplished, for example, by adjusting the zinc particle size distribution to provide in the anode a narrow distribution of similar zinc particle sizes, thereby enhancing porosity (diffusion paths) for the hydroxide ions. In addition to improving diffusion properties, the particle size distributions of this disclosure also provide the porosity sites for the precipitation of zinc oxide, thereby delaying anode passivation. This approach is effective for use in the anodes of zinc air battery cells and can be used in combination with other improvements disclosed herein.

A suitable zinc particle size distribution may be one in which at least 70% of the particles have a standard mesh-sieved particle size within a 100 micron size range and in which the mode of the distribution is between about 100 and about 300 microns. In one embodiment, a suitable zinc particle size distribution include particle size distributions meeting the above-noted tests and having a mode of 100 microns, 150 microns, or 200 microns, each plus or minus about 10%. In one embodiment, about 70% of the particles are distributed in a size distribution range narrower than about 100 microns, for example about 50 microns, or about 40 microns, or less.

The positive electrode may include a cathode can assembly 40, which includes a cathode can 44 and the cathode 42. An exemplary embodiment of the cathode 42 is best seen in FIG. 1. An active layer 72 of the cathode 42 is interposed between the separator 74 and the porous diffusion layer 57. Active layer 72 ranges preferably between about 50 microns and about 1,250 microns thick, and facilitates the reduction of oxygen to hydroxyl ions in the alkaline electrolyte with electrons generated from the oxidation of zinc in the anode. Separator 74 is a microporous plastic membrane about 25 microns thick, typically polypropylene, having the primary function of preventing anodic zinc particles from coming into physical contact with the remaining elements of the cathode 42. Separator 74 however, does permit passage of hydroxyl ions and water through to the cathode assembly. Here, the cathode is an air cathode and the cathode active layer includes carbon.

The side wall 47 of the cathode can 44 is joined to the bottom 46 of the can by intermediate element 80. The outer surface of intermediate element 80 extends, from its lower end at outer perimeter 52 of outer surface 50 of bottom 46, to its upper end which joins the outer surface 58 of the side wall 47 in a generally vertical orientation. The inner surface, if any, of the intermediate element 80 is represented at the joinder of the inner surface 48 of the bottom 46 and the inner surface 56 of the side wall 47. In some embodiments, the inner surfaces 48 and 56 come together at a sharp corner, such that the inner surface of the intermediate element is of nominal dimension. In some embodiments, to the extent the corner material is worked in forming the corner, the corner is work hardened, whereby the corner structure is strengthened with respect to bottom 46 and side wall 47 as the corner structure is formed at intermediate element 80.

In one embodiment, the cathode can may be formed entirely of a metal or alloy having a hydrogen overvoltage similar to that of the cathode (as opposed to plating or cladding the can) so long as sufficient strength and ductility are available from the material selected. Materials in addition to nickel, having such hydrogen overvoltage properties, include, for example and without limitation, cobalt and gold. In some embodiments, such materials may be coated as one or more coating layers onto the core layer by, for example, plating, cladding, or other application processes. The materials which provide sufficient strength and ductility may also be used as single layer materials in place of the composite structure. Single layer materials comprehend CRS or other suitable material as a core layer.

In one embodiment, steel strip plated with nickel and nickel alloy may be used because of cost considerations, and because pre-plated steel strip, which generally requires no post-plating processes, is commercially available. The metal in the can is preferably both ductile enough to withstand the drawing process, and strong and rigid enough, to tolerate and otherwise withstand the cell crimping and closure process as well as to provide primary overall structural strength to the cell.

In one embodiment, cathode cans may be made of nickel-plated stainless steel. In another embodiment, materials for cathode cans include nickel-clad stainless steel; cold-rolled steel plated with nickel; INCONEL® (a non-magnetic alloy of nickel); pure nickel with minor alloying elements (e.g. Nickel 200 and related family of Nickel 200 alloys such as Nickel 201, etc.), all available from Huntington Alloys, or DURANICKEL® 301, available from Special Metals. In one embodiment, some noble metals may also find use as plating, cladding, or other coating for can metals, including covering steel strip plated with nickel, and mild steel strip subsequently plated with nickel after fabricating the can.

In one embodiment, where multiple layers are used (e.g., CRS) coated on opposing sides with nickel, the present disclosure contemplates additional (e.g. fourth, fifth, etc.) layers, either between the nickel and CRS, or with a nickel layer between the CRS and the additional layer(s). For example, gold, cobalt, or other excellent electrical conductor can be deposited on some or all of the outer surface of the cathode can (outside the nickel layer) after the can is drawn, or drawn and ironed. As an alternative, such fourth etc. layer can be, for example, a bond-enhancing layer between the CRS and the nickel.

The can may be fabricated using a typical raw material structure of nickel/stainless steel (SST)/nickel/NI/SST/NI as the sheet structure, such sheet structure is from about 0.002 inch to about 0.012 inch. This may include about 0.003 inch to about 0.010 inch or about 0.004 inch to about 0.006 inch. In some embodiments, the thickness is about 0.002 inch thick, about 0.003 inch thick, about 0.004 inch thick, about 0.005 inch thick, or about 0.006 inch thick. In some embodiments, the thickness is about 0.005 inch thick. In some embodiments, each of the nickel layers represents about 1% to about 10%, of the overall thickness of the metal sheet in such 3-layer structure. This may include about 1.5% to about 9%, about 2% to about 8%, about 2.5% to about 7%, or about 3% to about 6.5%, of the overall thickness of the metal sheet in such 3-layer structure. In some embodiments, each of the nickel layers represents about 2% to about 4%, of the overall thickness of the metal sheet in such 3-layer structure. In some embodiments, each of the nickel layers represents about 2%, of the overall thickness of the metal sheet in such 3-layer structure.

The zinc-air battery may include a separator between the air cathode and the zinc anode. The separator may be an insulating gasket. The insulating gasket is positioned generally between the cathode can and the anode can. The insulating gasket may perform at least two primary functions. First, the insulating gasket serves as a closure for the cell, to prevent anode material and/or electrolyte from leaking from the cell between the outer surface of the side wall of the anode can and the inner surface of the side wall of the cathode can. Thus, the insulating gasket must possess adequate liquid sealing properties to prevent such leakage. Generally, such properties are available in a variety of resiliently deformable thermoplastic polymeric materials.

The zinc-air battery may be configured in accordance or consistent with zinc-air battery cell designs, such as zinc/silver oxide batteries, zinc/manganese dioxide batteries, etc., but with the improvements provided in detail herein. For example, in various embodiments the zinc-air battery may be designed to specifications suitable for a zinc-air button size battery. In some embodiments, the shape of the zinc-air battery is such that the anode is held in a somewhat flat or pan-shaped position. An exemplary embodiment of a zinc-air battery cell of the present disclosure may be as illustrated in FIG. 1.

Referring specifically to the cell 10 of the zinc-air battery, the negative electrode contains the anode can assembly 22, with an anode can 24 including an electrochemically reactive anode 26 contained therein and an insulating gasket 60. The anode can 24 has a base wall 28, and circumferential downwardly-depending side wall 30. Side walls 30 terminate in a circumferential can foot 36. The base wall and side walls 30 generally define the anode cavity 38 within the anode can 24, which cavity contains the anode 26.

In one embodiment, the anode can may include an alloy of copper, which includes copper and metals such as aluminum, silicon, cobalt, tin, chromium, zinc, and mixtures of any two or more thereof. In one embodiment, the entire anode can includes the alloy of copper. In some embodiments, the anode can includes a homogeneous blend of an alloy of copper. In some embodiments, the anode can does not include layered alloys. In some embodiments, the anode can does not include a coating.

The cathode 42 comprises the area from below the separator 74 to the cathode can 44. This cathode 42 area includes the porous diffusion layer 57, the cellulose air diffusion layer and the cathode active layer 72. Cathode can 44 has a bottom 46, and a circumferential upstanding side wall 47. Bottom 46 has a generally flat inner surface 48, a generally flat outer surface 50, and an outer perimeter 52 defined on the flat outer surface 50. A plurality of air ports 54 extend through the bottom 46 of the cathode can 44, providing avenues for traverse of oxygen through the bottom 46 into the adjacent cathode can assembly 40. An air reservoir 55 spaces the cathode can assembly 40 from bottom 46 and the corresponding air ports 54. A porous diffusion layer 57 and a cellulose air diffusion layer 32 fill the air reservoir 55. Side wall 47 of the cathode can has an inner surface 56 and an outer surface 58.

The anode can assembly 22 is electrically insulated from the cathode can assembly 40 by an insulating gasket 60. Insulating gasket 60 includes a circumferential side wall 62 disposed between the upstanding side wall 47 of the cathode can and the downwardly-depending side wall 30 of the anode can. An insulating gasket foot 64 is disposed generally between the can foot 36 of the anode can and the cathode can assembly 40. An insulating gasket top 66 is positioned at the locus where the side wall 62 of insulating gasket 60 extends from between the side walls 30 and 47 adjacent the top of the cell.

The outer surface 68 of the cell 10 is thus defined by portions of the outer surface of the top of the anode can 24, outer surface 58 of the side wall 47 of the cathode can 44, outer surface 50 of the bottom of the cathode can 44, and the top 66 of the insulating gasket 60.

The insulating gasket may also provide electrical insulation, preventing all effective direct electrical contact between the anode can 24 and the cathode can 44. Accordingly, the side wall 62 of the insulating gasket must circumscribe, and provide electrical insulation properties about, the entirety of the circumference of the battery between outer surface and inner surface 56, generally from the top of side wall 47 to the bottom of side wall 30. Similarly, the foot 64 of the insulating gasket must circumscribe, and provide electrical insulation properties about, the entirety of the circumference of the cell between foot 36 of side wall 30, the lower portion of side wall 47, and the outer perimeter portion of the cathode can assembly 40. The combination of good liquid sealing properties and good electrical insulation properties is typically achieved by molding known battery-grade nylon polymeric material in the desired configuration.

In order to meet the electrical insulation requirements, the insulating gasket may have good dielectric insulation properties, may have a minimum thickness about side wall 62, and may be free of any pinholes or other imperfections that might permit transmission of electric current between side walls 30 and 47. Thickness for the insulating gasket side wall 62 of about 200 to about 250 microns are common in conventional electrochemical cells. Thickness as thin as 100 microns are acceptable for cells of the disclosure, using the same resiliently deformable thermoplastic nylon material as the thicker insulating gaskets of the conventional art.

Depending on the structure of the battery to which the insulating gasket is to be applied, intermediate thicknesses such as, e.g., 150 microns, 140 microns, 127 microns, or the like, may be selected for some cells. However, where cell volume efficiency is a driving consideration, preferred thicknesses are less, for example 120 microns or 110 microns to as thin as 100 microns. Thus, the range of thicknesses for insulating gaskets 60 preferred for use in cells 10 of the disclosure has a lower end of about 100 microns.

In one embodiment, porous diffusion layer 57 is a microporous hydrophobic polymeric material such as a polytetrafluoroethylene (PTFE) membrane about 25 to about 100 microns thick, which permits passage of air through and which is generally impervious to battery electrolyte. In one embodiment, the porous diffusion layer 57 is Teflon™. In some embodiments, the porous diffusion layer 57, in combination with the air ports 54, is used to efficiently transport oxygen to the active reaction surface area of the cathode assembly.

In one embodiment, the cellulose air diffusion layer 32 is located underneath the porous diffusion layer 57 and acts as a protective lateral air diffusion layer. Specifically, when the cell is activated, the anode can assembly 22 presses down on the separator 74 and the cellulose air diffusion layer 32 helps to protect the air ports 54 from being completely covered.

In one embodiment, active layer 72 further includes a connecting substratum, namely a conductive woven nickel wire layer (not shown), capable of interfacing, as a current collector, with the cathode can. In one embodiment, carbon forms a matrix surrounding the conductive layer of nickel wire. In one embodiment, nickel is used for the conductive layer because nickel exhibits little or no corrosion in the environment of the zinc air cell, and also because nickel is an excellent electrical conductor. In one embodiment, the thickness of the cathode assembly between the separator 74 and the porous diffusion layer 57 is as small as possible.

In another embodiment, the zinc-air battery may be prepared by any means known in the art, so long as the resulting battery does not conflict with the disclosures presented herein. Thus, the present disclosure includes a method of preparing a zinc-air battery including the components and their respective concentrations as discussed throughout the entirety of this disclosure.

The invention is further defined by the following embodiments:

Embodiment A. A zinc-air battery comprising an air cathode, a zinc anode, and an electrolyte, wherein the electrolyte comprises an amphoteric fluorosurfactant.

Embodiment B. The zinc-air battery of Embodiment A, wherein the amphoteric fluorosurfactant comprises a betaine functionality.

Embodiment C. The zinc-air battery of any one of Embodiments A-B, wherein the amphoteric fluorosurfactant is CHEMGUARD® S-111, CHEMGUARD® S-500, CAPSTONE® FS-50, CAPSTONE® FS-51, APFS-14, DYNAX DX3001, ZONYL® FSK, ZONYL® FS-500 or a combination of any two or more thereof.

Embodiment D. The zinc-air battery of any one of Embodiments A-C, wherein the amphoteric fluorosurfactant is present in the electrolyte from about 2000 ppm to about 20000 ppm.

Embodiment E. The zinc-air battery of any one of Embodiments A-D, wherein the amphoteric fluorosurfactant is present in the electrolyte from about 3000 ppm to about 12000 ppm.

Embodiment F. The zinc-air battery of any one of Embodiments A-E, wherein the electrolyte further comprises a surfactant that is hexyl diphenyl oxide disulfonic acid, diethylenetriamine, octylphenoxypolyethoxyethanol, a compound of Formula (III), or a combination of any two or more thereof; and the compound represented as Formula (III) is:

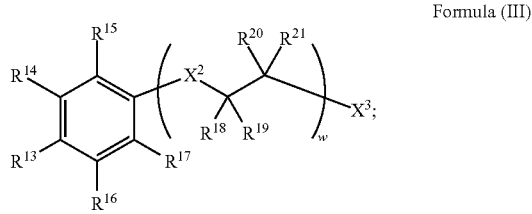

Formula (III)

$R^{13}$, $R^{14}$, $R$, $R^{16}$, $R^{17}$, $R$, $R^{19}$, $R^{20}$, and $R^{21}$ are each independently a hydrogen, alkyl, alkenyl, or cycloalkyl group; $X^2$ is O or S; $X^3$ is OH or SH; and w is 5-50.

Embodiment G. The zinc-air battery of Embodiment F, wherein $R^{13}$ is a $C_1$-$C_{12}$ alkyl group; $R^{14}$, $R^{15}$, $R^{16}$, $R^{17}$, $R^{18}$, $R^{19}$, $R^{20}$, and $R^{21}$ are each hydrogen; $X^2$ is O; $X^3$ is OH; w is 5-15.

Embodiment H. The zinc-air battery of any one of Embodiments F-G, wherein $R^{13}$ is octyl (e.g. n-octyl or 1,1,3,3-tetramethylbutyl); $R^{14}$, $R^{15}$, $R^{16}$, $R^{17}$, $R^{18}$, $R^{19}$, $R^{20}$ and $R^{21}$ are each hydrogen; $X^2$ is O; $X^3$ is OH; w is 5-15.

Embodiment I. The zinc-air battery of any one of Embodiments F-H, wherein $R^{13}$ is octyl; $R^{14}$, $R^{15}$, $R^{16}$, $R^{17}$, $R^{18}$, $R^{19}$, $R^{20}$, and $R^{21}$ are each hydrogen; $X^2$ is O; $X^3$ is OH; w is 10-15.

Embodiment J. The zinc-air battery of any one of Embodiments A-I, wherein the electrolyte further comprises a corrosion inhibitor, a gelling agent, zinc oxide, potassium hydroxide, sodium hydroxide, polyacrylate polymer, or a combination of any two or more thereof.

Embodiment K. The zinc-air battery of Embodiment J, wherein the electrolyte further comprises a corrosion inhibitor that is indium hydroxide, lithium hydroxide, polyethylene glycol, polypropylene glycol, polyaniline, or a combination of any two or more thereof.

Embodiment L. The zinc-air battery of any one of Embodiments A-K further comprising polyaniline.

Embodiment L'. The zinc-air battery of Embodiment L where the polyaniline is emeraldine polyaniline.

Embodiment M. The zinc-air battery of any one of Embodiments A-L further comprising a separator between the air cathode and the zinc anode.

Embodiment N. The zinc-air battery of any one of Embodiments A-M, wherein the electrolyte further comprises a corrosion inhibitor that is present in the electrolyte from about 100 ppm to about 25000 ppm.

Embodiment O. The zinc-air battery of any one of Embodiments A-N, wherein the electrolyte further comprising a gas suppressing additive.

Embodiment P. The zinc-air battery of Embodiment O, wherein the gas suppressing additive is zinc oxide, aluminum hydroxide, calcium hydroxide, lithium hydroxide, or a combination of any two or more thereof.

Embodiment Q. An electrolyte comprising an amphoteric fluorosurfactant and a corrosion inhibitor.

Embodiment R. The electrolyte of Embodiment Q, wherein the amphoteric fluorosurfactant is CHEMGUARD® S-111, CHEMGUARD® S-500, CAPSTONE® FS-50, CAPSTONE® FS-51, APFS-14, DYNAX DX3001, ZONYL® FSK, ZONYL® FS-500 or a combination of any two or more thereof; and the corrosion inhibitor is indium hydroxide, lithium hydroxide, polyethylene glycol, polypropylene glycol, polyaniline, or a combination of any two or more thereof.

Embodiment S. The electrolyte of Embodiment Q or R, wherein the amphoteric fluorosurfactant is present in the electrolyte from about 200 ppm to about 20000 ppm; and the corrosion inhibitor is present in the electrolyte from about 100 ppm to about 25000 ppm.

Embodiment AA. A zinc-air battery comprising an air cathode, a zinc anode, and an electrolyte, wherein the electrolyte comprises a surfactant of Formula (II):

Formula (II)

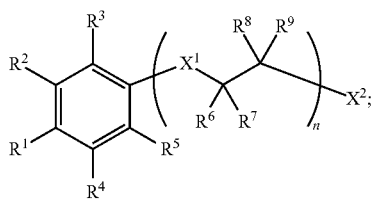

wherein $R^1$, $R^2$, $R^3$, $R^4$, $R^5$, $R^6$, $R^7$, $R^8$, and $R^9$ are each independently a hydrogen, alkyl, alkenyl, or cycloalkyl group; $X^1$ is O or S; $X^2$ is OH or SH; and n is 5-50.

Embodiment BB. The zinc-air battery of Embodiment AA, wherein $R^1$ is a $C_1$-$C_{12}$ alkyl group; $R^2$, $R^3$, $R^4$, $R^5$, $R^6$, $R^7$, $R^8$, and $R^9$ are each hydrogen; $X^1$ is O; $X^2$ is OH; and n is 5-15.

Embodiment CC. The zinc-air battery of Embodiment AA or BB, wherein $R^1$ is octyl (e.g. n-octyl or 1,1,3,3-tetramethylbutyl); $R^2$, $R^3$, $R^4$, $R^5$, $R^6$, $R^7$, $R^8$, and $R^9$ are each hydrogen; $X^1$ is O; $X^2$ is OH; and n is 5-15.

Embodiment DD. The zinc-air battery of any one of Embodiments AA-CC, wherein the wherein the surfactant of Formula (II) is Igepal® CA-630, Triton® X-100, or a combination thereof.

Embodiment EE. The zinc-air battery of any one of Embodiments AA-DD, wherein the surfactant of Formula (II) is present in the electrolyte from about 2000 ppm to about 20000 ppm.

Embodiment FF. The zinc-air battery of any one of Embodiments AA-EE, wherein the surfactant of Formula (II) is present in the electrolyte from about 3000 ppm to about 12000 ppm.

Embodiment GG. The zinc-air battery of any one of Embodiments AA-EE, wherein the electrolyte further comprises a second surfactant that is hexyl diphenyl oxide sulfonic acid, diethylenetriamine, an amphoteric fluorosurfactant, or a combination of any two or more thereof.

Embodiment HH. The zinc-air battery of any one of Embodiments AA-GG, wherein the electrolyte further comprises a corrosion inhibitor, a gelling agent, zinc oxide, potassium hydroxide, sodium hydroxide, polyacrylate polymer, or a combination of any two or more thereof.

Embodiment JJ. The zinc-air battery of Embodiment HH, wherein the electrolyte further comprises a corrosion inhibitor that is indium hydroxide, lithium hydroxide, polyethylene glycol, polypropylene glycol, polyaniline, or a combination of any two or more thereof.

Embodiment KK. The zinc-air battery of any one of Embodiments AA-GG further comprising a polyaniline.

Embodiment LL. The zinc-air battery of Embodiment LL where the polyaniline is emeraldine polyaniline.

Embodiment MM. The zinc-air battery of any one of Embodiments AA-LL further comprising a separator between the air cathode and the zinc anode.

Embodiment NN. The zinc-air battery of any one of Embodiments AA-MM, wherein the electrolyte further comprises a corrosion inhibitor that is present in the electrolyte from about 100 ppm to about 25000 ppm.

Embodiment OO. The zinc-air battery of any one of Embodiments AA-NN, wherein the electrolyte further comprising a gas suppressing additive.

Embodiment PP. The zinc-air battery of Embodiment OO, wherein the gas suppressing additive is zinc oxide, aluminum hydroxide, calcium hydroxide, lithium hydroxide, or a combination of any two or more thereof.

Embodiment QQ. An electrolyte comprising a corrosion inhibitor and a surfactant of Formula (II):

Formula (II)

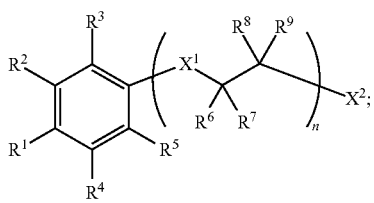

wherein $R^1$, $R^2$, $R^3$, $R^4$, $R^5$, $R^6$, $R^7$, $R^8$, and $R^9$ are each independently a hydrogen, alkyl, alkenyl, or cycloalkyl group; $X^1$ is O or S; $X^2$ is OH or SH; and n is 5-50.

Embodiment RR. The electrolyte of Embodiment QQ, wherein $R^1$ is a $C_1$-$C_{12}$ alkyl group; $R^2$, $R^3$, $R^4$, $R^5$, $R^6$, $R^7$, $R^8$, and $R^9$ are each hydrogen; $X^1$ is O; $X^2$ is OH; and n is 5-15.

Embodiment SS. The electrolyte of Embodiment QQ or RR, wherein $R^1$ is octyl or 1,1,3,3-tetramethylbutyl; $R^2$, $R^3$, $R^4$, $R^5$, $R^6$, $R^7$, $R^8$, and $R^9$ are each hydrogen; $X^1$ is O; $X^2$ is OH; and n is 5-15.

Embodiment TT. The electrolyte of any one of Embodiments QQ-SS wherein the corrosion inhibitor is indium hydroxide, lithium hydroxide, polyethylene glycol, polypropylene glycol, polyaniline, or a combination of any two or more thereof; and the surfactant of Formula (II) is Igepal® CA-630, Triton® X-100, or a combination of any two or more thereof.

Embodiment UU. The zinc-air battery of Embodiment QQ or RR, wherein the surfactant of Formula (II) is present in the electrolyte from about 200 ppm to about 20000 ppm; and the corrosion inhibitor is present in the electrolyte from about 100 ppm to about 25000 ppm.

The present invention, thus generally described, will be understood more readily by reference to the following examples, which are provided by way of illustration and are not intended to be limiting of the present invention.

EXAMPLES

In the following examples, zinc-air battery cells were prepared and tested.

Example 1

Preparation of the Control Battery Cell

A control cell was prepared having a Zn anode, a caustic electrolyte, and an amine carboxylate-based surfactant. Anode preparation involved a two step process-dry zinc blending and electrolyte preparation. The zinc blend included Zn—Pb—In—Al alloy (98.99% ppm), a cross-linked polyacrylic acid based gelling agent (0.30%), clay additive (0.20%), indium hydroxide (0.3%) and Teflon™ powder (0.03%). De-ionized water (0.20%) was added as an intermediary step during the zinc blending and subsequently dried off. Concentrations are specified based on the total zinc weight in the anode. In the electrolyte preparation step, suitable amount of KOH was diluted with de-ionized water to adjust the KOH concentration to 33%. 7500 ppm of the amine carboxylate surfactant and 1000 ppm of a second cross-linked polyacrylic acid based gelling agent were added to and mixed with the KOH to complete the process. During cell assembly, the blended zinc was dispensed into the anode can cavity followed by the electrolyte in set proportions which varied as per cell size.

Example 2

Preparation of Battery Cell with an Amphoteric Fluorosurfactant

A zinc-air cell was also prepared in the same manner as the control, but having an amphoteric fluorosurfactant (4000-15000 ppm) and lithium hydroxide (10000-20000 ppm) included in the electrolyte instead of the amine carboxylate.

Example 3

Preparation of Battery Cell with IGEPAL® CA-630

Another zinc-air cell was prepared in the same manner as the control as described in Example 1, but having a surfactant of Formula (II) (e.g. IGEPAL® CA-630) included in the electrolyte instead of the amine carboxylate.

In the Examples presented below, zinc-air cells of the disclosed invention were tested under the hearing aid standard and wireless streaming discharge tests. Test protocols are described in detail in the subsequent paragraphs.
Measurement of Battery Performance Under Hearing Aid Standard and Wireless Streaming Test Protocols:

Electrochemical cells may be tested in accordance with several methods under the American National Standards Institute (ANSI) testing standards. For primary hearing aid batteries using aqueous electrolytes, a pair of ANSI tests known as the hearing aid standard and wireless streaming tests determine cell performance and longevity. Hearing aid standard test involves applying a constant current load of 10 mA for 100 milliseconds followed by a 2 mA load for 119 minutes, 59 seconds and 900 milliseconds thereafter followed by a 12 hour rest period. The daily cycle is 12 hours on load followed by 12 hours off load (or under rest period). The cycle is repeated until the cell operating voltage drops below 1.05 V. The wireless streaming test involves alternating between a 5 mA 15 minute load and a 2 mA 45 minute load for 12 hours and a subsequent 12 hour rest period. The (12 hour ON/12 hour OFF) load cycle continues till the cell running voltage drops below 1.1 V.

Figure 6:
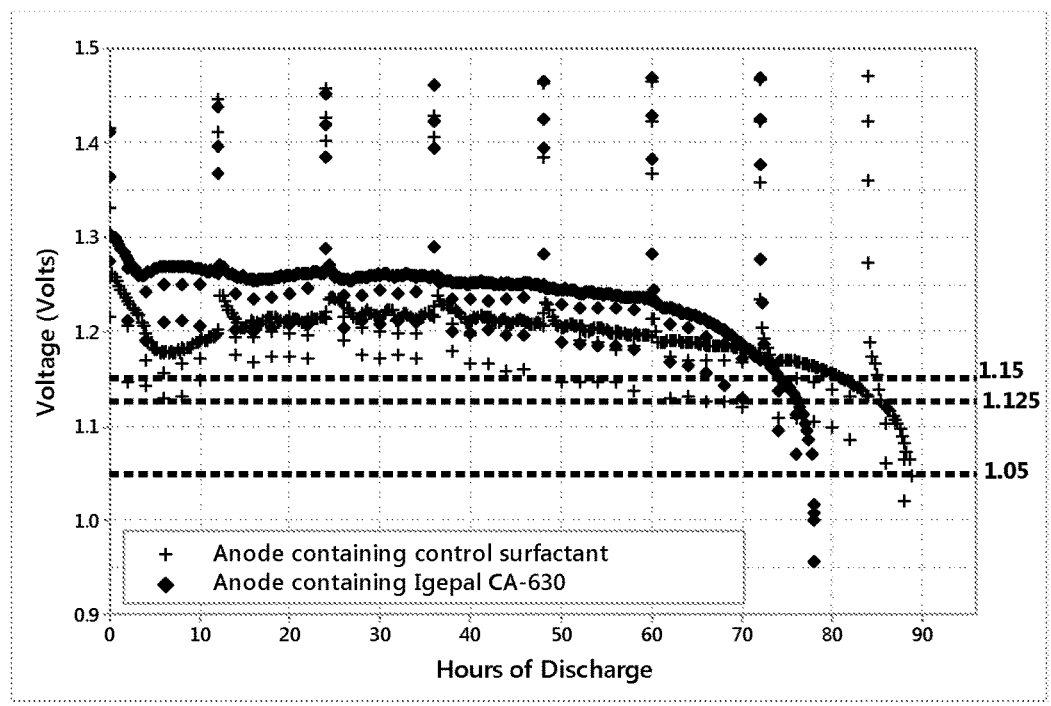
FIG. 6 is a hearing aid standard pulse discharge curve comparison between a control anode (containing a control surfactant) and an anode containing 4000 ppm of an IGEPAL® surfactant at 4-month room temperature delay, according to the examples.
Figure 7:
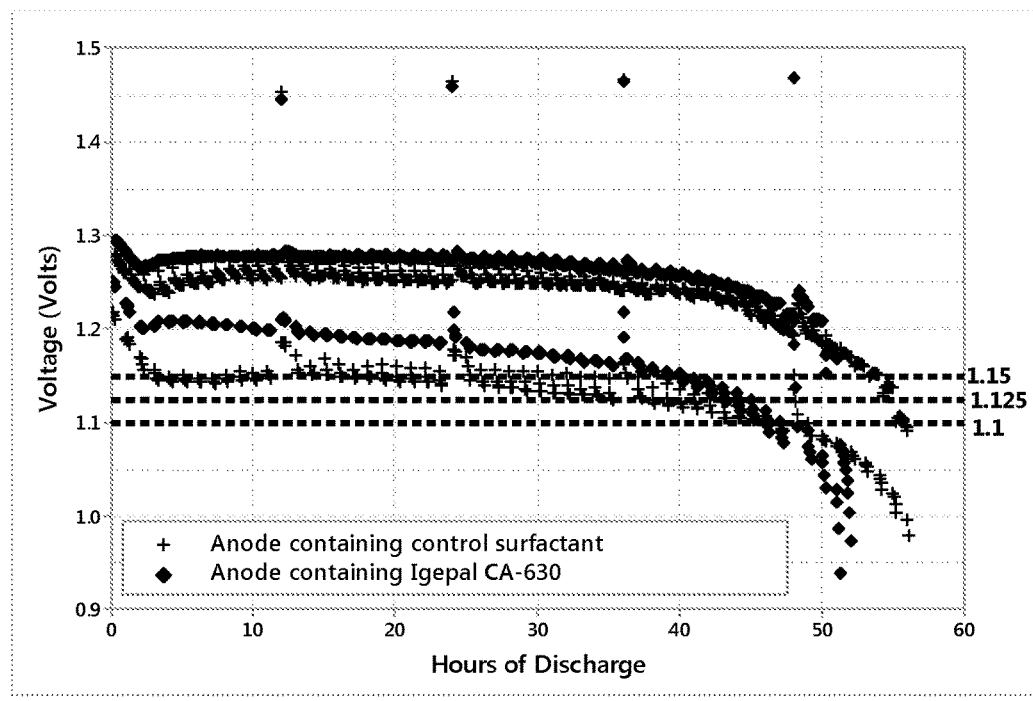
FIG. 7 is a wireless streaming pulse discharge curve comparison between a control anode (containing a control surfactant) and an anode containing 4000 ppm of an IGEPAL® surfactant at 4-month room temperature delay, according to the examples.

FIGS. 2-5 compare the discharge curve profiles of the anode containing an amphoteric fluorosurfactant of Formula (I) with that of a conventional anode containing the control surfactant and FIGS. 6 and 7 compare the discharge curve profiles of the anode containing IGEPAL® CA-630 with that of a conventional anode containing the control surfactant, on the hearing aid standard and wireless streaming pulse tests, respectively. For either test, a greater 'headspace' exists between the operating voltage and the concerned end point voltage, whenever an amphoteric fluorosurfactant of Formula (I) or IGEPAL® CA-630 is used vis-à-vis control surfactant. It is clear that hearing aid discharge performance operating as per ANSI test protocols are superior with the amphoteric fluorosurfactant of Formula (I) and with IGEPAL® CA-630, relative to the control surfactant. The batteries with the control surfactant achieved end points much earlier during the discharge.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A zinc-air battery comprising an air cathode, a zinc anode, and an electrolyte, wherein the electrolyte comprises an amphoteric fluorosurfactant of Formula (I):

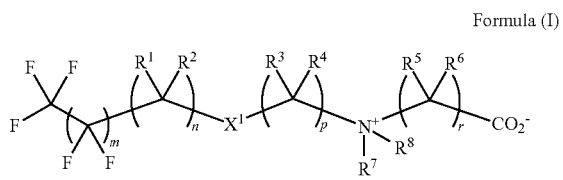

Formula (I)

wherein
$R_1$, $R_2$, $R_3$, $R_4$, $R_5$, $R_6$, $R_7$, and $R_8$ are each independently a hydrogen, alkyl, alkenyl, or cycloalkyl group;
$X_1$ is —C(O)—, —$SO_2$—, —C(O)$NR_a$—, —$SO_2NR_a$—, —$CO_2$—, or —$SO_2O$—;
$R_a$ is H or an alkyl group;
m and p are each independently 0, 1, 2, 3, 4, 5, or 6; and
n and r are each independently 1, 2, 3, 4, or 5.

2. The zinc-air battery of claim 1, wherein
$R_1$-$R_6$ are H;
$R_7$ and $R_8$ are $C_1$-$C_4$ alkyl;
$X_1$ is $SO_2$ or $SO_2NR_a$;
$R_a$ is H;
n is 2 or 3;
p is 2, 3, 4, or 5;
m is from 3 to 6; and
r is 1.

3. The zinc-air battery of claim 1, wherein the amphoteric fluorosurfactant is present in the electrolyte from about 200 ppm to about 20000 ppm.

4. The zinc-air battery of claim 1, wherein the amphoteric fluorosurfactant is present in the electrolyte from about 4000 ppm to about 15000 ppm.

5. The zinc-air battery of claim 1, wherein:
the electrolyte further comprises a surfactant that is hexyl diphenyl oxide disulfonic acid, diethylenetriamine, octylphenoxypolyethoxyethanol, a compound of Formula (III), or a combination of any two or more thereof, and the compound represented as Formula (III) is:

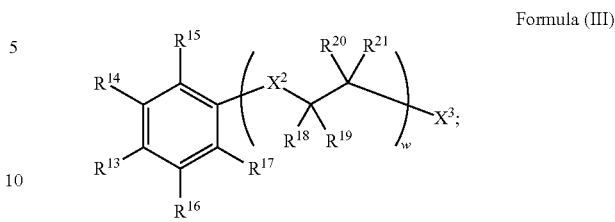

Formula (III)

$R_{13}$, $R_{14}$, $R_{15}$, $R_{16}$, $R_{17}$, $R_{18}$, $R_{19}$, $R_{20}$, and $R_{21}$ are each independently a hydrogen, alkyl, alkenyl, or cycloalkyl group;
$X_2$ is O or S;
$X_3$ is OH or SH; and
w is 5-50.

6. The zinc-air battery of claim 5, wherein the electrolyte comprises a compound of Formula (III), and wherein $R_{13}$ is a $C_1$-$C_{12}$ alkyl group; $R_{14}$, $R_{15}$, $R_{16}$, $R_{17}$, $R_{18}$, $R_{19}$, $R_{20}$, and $R_{21}$ are each hydrogen; $X_2$ is O; $X_3$ is OH; w is 5-15.

7. The zinc-air battery of claim 5, wherein the electrolyte comprises a compound of Formula (III), and wherein $R_{13}$ is octyl or 1,1,3,3-tetramethylbutyl; $R_{14}$, $R_{15}$, $R_{16}$, $R_{17}$, $R_{18}$, $R_{19}$, $R_{20}$, and $R_{21}$ are each hydrogen; $X_2$ is O; $X_3$ is OH; w is 5-15.

8. The zinc-air battery of claim 1, wherein the electrolyte further comprises a corrosion inhibitor, a gelling agent, zinc oxide, potassium hydroxide, sodium hydroxide, polyacrylate polymer, or a combination of any two or more thereof.

9. The zinc-air battery of claim 8, wherein the electrolyte further comprises a corrosion inhibitor selected from a group consisting of indium hydroxide, lithium hydroxide, polyethylene glycol, polypropylene glycol, polyaniline, or a combination of any two or more thereof.

10. The zinc-air battery of claim 9, wherein the corrosion inhibitor is lithium hydroxide.

11. The zinc-air battery of claim 1 further comprising a separator between the air cathode and the zinc anode.

12. The zinc-air battery of claim 1, wherein the electrolyte further comprises a corrosion inhibitor that is present in the electrolyte from about 100 ppm to about 25000 ppm.

13. The zinc-air battery of claim 1, wherein the electrolyte further comprises a gas suppressing additive.

14. The zinc-air battery of claim 13, wherein the gas suppressing additive is zinc oxide, lead acetate, bismuth oxide, aluminum hydroxide, calcium hydroxide, lithium hydroxide, or a combination of any two or more thereof.

* * * * *